United States Patent
Lim et al.

(10) Patent No.: US 10,218,024 B2
(45) Date of Patent: Feb. 26, 2019

(54) SCANDIA-STABLIZIED ZIRCONIA ELECTROLYTE FOR SOLID OXIDE FUEL CELL HAVING IMPROVED STABILITY IN REDUCING ATMOSPHERE

(71) Applicant: KCERACELL CO., LTD., Chungcheongnam-do (KR)

(72) Inventors: Kyoung Tae Lim, Daejeon (KR); Hee Lak Lee, Daejeon (KR); Hyeong Cheol Shin, Daejeon (KR)

(73) Assignee: KCERACELL CO., LTD., Chungcheongnam-do (KR)

( * ) Notice: Subject to any disclaimer, the term of this patent is extended or adjusted under 35 U.S.C. 154(b) by 91 days.

(21) Appl. No.: 15/222,454

(22) Filed: Jul. 28, 2016

(65) Prior Publication Data

US 2017/0373337 A1 Dec. 28, 2017

(51) Int. Cl.

| | |
|---|---|
| *H01M 8/12* | (2016.01) |
| *C04B 35/48* | (2006.01) |
| *H01M 8/1253* | (2016.01) |
| *C04B 35/486* | (2006.01) |
| *H01M 8/124* | (2016.01) |

(52) U.S. Cl.
CPC ......... *H01M 8/1253* (2013.01); *C04B 35/486* (2013.01); *C04B 2235/3224* (2013.01); *C04B 2235/3229* (2013.01); *C04B 2235/6567* (2013.01); *C04B 2235/762* (2013.01); *H01M 2008/1293* (2013.01); *H01M 2300/0077* (2013.01); *Y02E 60/525* (2013.01)

(58) Field of Classification Search
CPC .... H01M 8/0236; H01M 8/10; H01M 8/1016; H01M 8/1253; H01M 8/144; H01M 2008/1239

See application file for complete search history.

(56) References Cited

U.S. PATENT DOCUMENTS

| | | | |
|---|---|---|---|
| 2007/0082254 A1* | 4/2007 | Hiwatashi | H01M 4/9016 429/489 |
| 2015/0255821 A1* | 9/2015 | Lim | H01M 8/1253 429/496 |

FOREIGN PATENT DOCUMENTS

| | | |
|---|---|---|
| JP | 2008-305804 A | 12/2008 |
| KR | 10-11867666 B1 | 9/2012 |
| KR | 10-2012-0137917 A | 12/2012 |

* cited by examiner

*Primary Examiner* — Scott J. Chmielecki
(74) *Attorney, Agent, or Firm* — Rabin & Berdo, P.C.

(57) ABSTRACT

Disclosed is a scandia-stabilized zirconia electrolyte for a solid oxide fuel cell, which is configured such that at least one oxide selected from among gadolinium oxide ($Gd_2O_3$) and samarium oxide ($Sm_2O_3$) is co-doped with ytterbium oxide ($Yb_2O_3$) to thus improve stability in a reducing atmosphere. The scandia-stabilized zirconia electrolyte of the invention can be stabilized into a cubic crystal structure at room temperature while retaining the inherently high oxygen ionic conductivity of a scandia-stabilized zirconia electrolyte (11ScSZ), and can also ensure stability in a reducing atmosphere by solving the problem with a conventional ceria ($CeO_2$)-doped scandia-stabilized zirconia in which the ionic conductivity continuously deteriorates in a reducing atmosphere.

5 Claims, 14 Drawing Sheets

SCANDIA-STABLIZIED ZIRCONIA ELECTROLYTE FOR SOLID OXIDE FUEL CELL HAVING IMPROVED STABILITY IN REDUCING ATMOSPHERE

BACKGROUND OF THE INVENTION

1. Field of the Invention

The present invention relates to a scandia-stabilized zirconia electrolyte for a solid oxide fuel cell and, more particularly, to a scandia-stabilized zirconia electrolyte for a solid oxide fuel cell, which is configured such that at least one oxide selected from among gadolinium oxide ($Gd_2O_3$) and samarium oxide ($Sm_2O_3$) is co-doped with ytterbium oxide ($Yb_2O_3$) to thus improve stability in a reducing atmosphere.

2. Description of the Related Art

Among a variety of fuel cells, a solid oxide fuel cell (SOFC) using, as a key part, a ceramic unit cell comprising ceramic electrodes and an electrolyte may operate at the highest temperature, thus exhibiting very high energy conversion efficiency. Furthermore, SOFC enables a gas turbine or a micro gas turbine to operate in two steps using high-temperature steam that is discharged through high-temperature operation, thus favorably constructing a high-efficiency hybrid power generation system. In addition, since SOFC advantageously has high fuel selectivity, not only hydrogen fuel gas but also various kinds of hydrocarbonaceous fuel or bio gas may be used. Also, the U.S. Department of Energy (DOE) aims to develop MW-class integrated gasification fuel cell (IGFC) technology.

Scandia-stabilized zirconia ($Sc_2O_3$-stabilized $ZrO_2$, abbreviated as "ScSZ") is a zirconia-based electrolyte material having the highest oxygen ionic conductivity due to the use of $Sc^{3+}$ (0.87 Å) having a cation radius that approximates the cation radius (0.84 Å) of $Zr^{4+}$.

In particular, $(Sc_2O_3)_{0.11}(ZrO_2)_{0.89}$ (abbreviated as "11ScSZ") is regarded as the ideal electrolyte material because its ionic conductivity is not lowered even after long-term use in an air atmosphere, but the 11ScSZ electrolyte material has been found to suffer from phase transition, showing a monoclinic structure at a temperature lower than about 630° C. and a cubic structure at higher temperatures.

With the goal of solving such a phase transition problem, thorough research and development is ongoing. In this regard, Toho Gas in Japan has developed and commercialized a novel electrolyte that is stabilized into a cubic structure in the temperature range from room temperature to high temperatures by substituting some elements of the 11ScSZ electrolyte with ceria ($CeO_2$). As disclosed in JP 2008-305804 A, the electrolyte composition of Toho Gas is configured such that 8.5 to 15 mol % of scandia is doped with 0.5 to 2.5 mol % of yttria and/or ceria and simultaneously the total amount of scandia and yttria and/or ceria is set in the range of 9 to 15 mol %. An actually commercially available electrolyte product is 10Sc1CeSZ (10 mol % $Sc_2O_3$-1 mol % $CeO_2$-89 mol % $ZrO_2$).

The 10Sc1CeSZ electrolyte has solved the phase transition problem, but new problems occur therein. Specifically, a unit cell using the 10Sc1CeSZ electrolyte is problematic because the power density (W/cm²) is continuously decreased with an increase in the operating time thereof.

This is considered to be due to the electrolyte material. Specifically, in the case where ceria ($CeO_2$), used for 10Sc1CeSZ, is placed in a reducing atmosphere, $Ce^{4+}$ may be converted into $Ce^{3+}$ at a temperature equal to or less than 650° C. In real-world applications, the 10Sc1CeSZ electrolyte shows a color close to a white color after sintering and maintains the same color in a high-temperature air atmosphere, but the color is converted into an orange color in a high-temperature reducing atmosphere.

Hence, the instability of the 10Sc1CeSZ electrolyte in a reducing atmosphere is deemed to cause the continuous power decrease in the unit cell, and thus, there is a need to develop a novel zirconia electrolyte material in which the scandia-stabilized zirconia is stabilized into a cubic crystal structure and the stability thereof is improved in a reducing atmosphere.

CITATION LIST

Patent Literature

Patent Document 1: Korean Patent Application Publication No. 10-2012-0137917
Patent Document 2: Korean Patent No. 10-1186766
Patent Document 3: Japanese Patent Application Publication No. 2008-305804

SUMMARY OF THE INVENTION

Accordingly, the present invention has been made keeping in mind the above problems encountered in the related art, and the present invention is intended to provide a scandia-stabilized zirconia electrolyte for a solid oxide fuel cell, which is configured such that at least one oxide selected from among gadolinium oxide ($Gd_2O_3$) and samarium oxide ($Sm_2O_3$) is co-doped with ytterbium oxide ($Yb_2O_3$), whereby the crystal structure of the scandia-stabilized zirconia is stabilized into a cubic structure at room temperature while retaining the inherently high oxygen ionic conductivity of a scandia-stabilized zirconia electrolyte (11ScSZ).

In addition, the present invention is intended to provide a scandia-stabilized zirconia electrolyte for a solid oxide fuel cell, in which stability thereof is ensured in a reducing atmosphere by solving the problem with a conventional ceria ($CeO_2$)-doped scandia-stabilized zirconia in which the ionic conductivity continuously deteriorates in a reducing atmosphere.

However, the foregoing is merely illustrative, and the technical spirit of the present invention is not limited thereto.

The present invention provides a scandia-stabilized zirconia electrolyte for a solid oxide fuel cell, which is a zirconia ($ZrO_2$) electrolyte stabilized by doping with scandium oxide ($Sc_2O_3$), wherein at least one oxide selected from among gadolinium oxide ($Gd_2O_3$) and samarium oxide ($Sm_2O_3$) is co-doped with ytterbium oxide ($Yb_2O_3$) to thus improve stability in a reducing atmosphere.

In some embodiments of the present invention, the scandia-stabilized zirconia electrolyte may have a cubic crystal structure at room temperature and a cation radius ranging from 0.8440 to 0.8453 Å.

In some embodiments of the present invention, the scandia-stabilized zirconia electrolyte may have a composition represented by Chemical Formula 1 below:

$$(Sc_2O_3)_x(Re_2O_3)_y(Yb_2O_3)_z(ZrO_2)_{1-x-y-z} \qquad \text{[Chemical Formula 1]}$$

wherein 0.08≤x≤0.11, 0.0005≤y≤0.01, 0.0005≤z≤0.01, and $Re_2O_3$ is at least one selected from among $Gd_2O_3$ and $Sm_2O_3$.

In some embodiments of the present invention, in Chemical Formula 1, y:z may range from 1:3 to 3:1.

In some embodiments of the present invention, in Chemical Formula 1, y+z may be 0.01 or more.

In some embodiments of the present invention, in Chemical Formula 1, $Re_2O_3$ may be gadolinium oxide ($Gd_2O_3$) and may have a cation radius ranging from 0.8441 to 0.8450 Å.

In some embodiments of the present invention, in Chemical Formula 1, $Re_2O_3$ may be samarium oxide ($Sm_2O_3$) and may have a cation radius ranging from 0.8443 to 0.8450 Å.

According to exemplary embodiments of the present invention, a scandia-stabilized zirconia electrolyte for a solid oxide fuel cell is configured such that at least one oxide selected from among gadolinium oxide ($Gd_2O_3$) and samarium oxide ($Sm_2O_3$) is co-doped with ytterbium oxide ($Yb_2O_3$), whereby the crystal structure of the scandia-stabilized zirconia can be stabilized into a cubic structure at room temperature while retaining the inherently high oxygen ionic conductivity of a scandia-stabilized zirconia electrolyte (11ScSZ).

Also, the scandia-stabilized zirconia electrolyte for a solid oxide fuel cell can ensure stability in a reducing atmosphere by solving the problem with a conventional ceria ($CeO_2$)-doped scandia-stabilized zirconia in which the ionic conductivity continuously deteriorates in a reducing atmosphere.

The aforementioned effects are set forth to illustrate, but are not to be construed as limiting the scope of the present invention.

BRIEF DESCRIPTION OF THE DRAWINGS

The above and other features and advantages of the present invention will be more clearly understood from the following detailed description taken in conjunction with the accompanying drawings, in which.

DESCRIPTION OF SPECIFIC EMBODIMENTS

Figure 1:
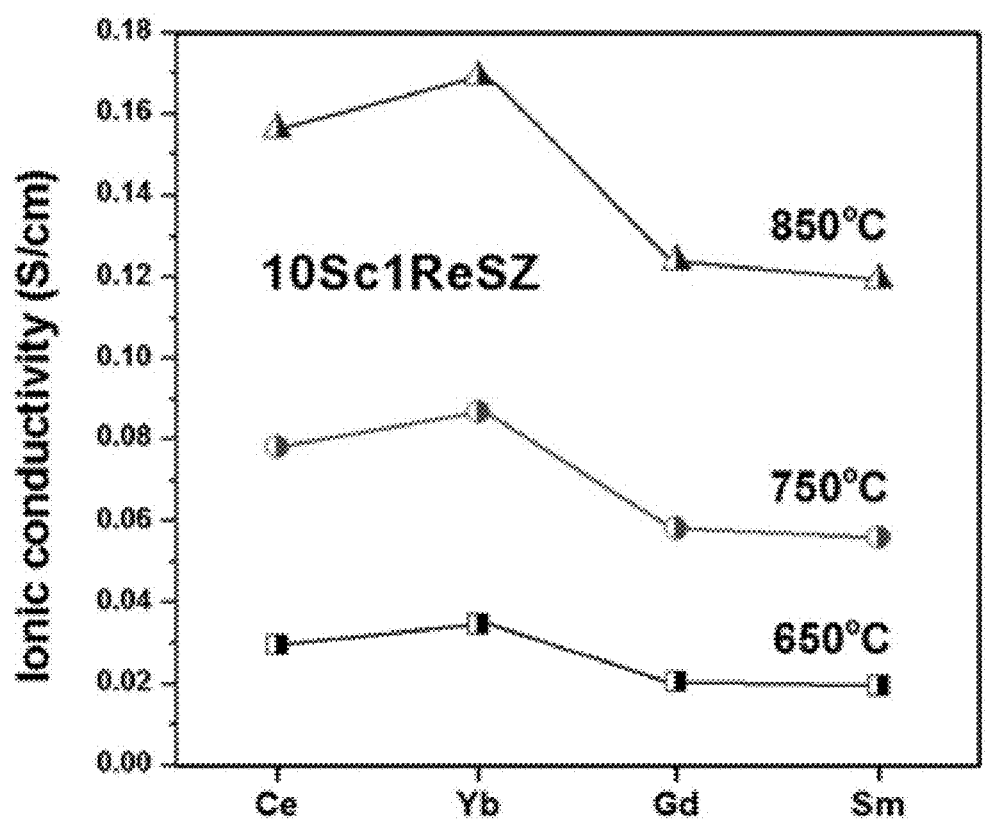
FIG. 1 is a graph showing the results of measurement of the ionic conductivity of 10Sc1ReSZ (Re=Ce, Yb, Gd, Sm) electrolytes at different operating temperatures in an air atmosphere.

Hereinafter, a detailed description will be given of preferred embodiments of the present invention with reference to the appended drawings. The embodiments of the present invention are provided to more fully describe the technical spirit of the present invention to those skilled in the art, and may be modified in various ways and are not construed as limiting the present invention. Rather, these embodiments are provided to complete the present disclosure and to fully deliver the technical spirit of the present invention to those skilled in the art. As used herein, the term "and/or" may include any one of the listed items and any combination of one or more thereof. Throughout the drawings, the same reference numerals refer to the same or like parts. Furthermore, various parts and areas in the drawings are schematically depicted. Hence, the technical spirit of the present invention is not limited by the relative sizes or intervals shown in the drawings.

According to the present invention, a scandia-stabilized zirconia electrolyte for a solid oxide fuel cell is a zirconia ($ZrO_2$) electrolyte which is stabilized by doping with scandium oxide ($Sc_2O_3$), and is configured such that at least one oxide selected from among gadolinium oxide ($Gd_2O_3$) and samarium oxide ($Sm_2O_3$) is co-doped with ytterbium oxide ($Yb_2O_3$) to thus improve stability in a reducing atmosphere.

The continuous deterioration of ionic conductivity in a reducing atmosphere, which is regarded as problematic in a conventional ceria ($CeO_2$)-doped scandia-stabilized zirconia, is solved, thereby ensuring stability in a reducing atmosphere.

The scandia-stabilized zirconia electrolyte has a cubic crystal structure at room temperature and a cation radius ranging from 0.8440 to 0.8453 Å. Also, at least one selected from among gadolinium oxide ($Gd_2O_3$) and samarium oxide ($Sm_2O_3$) is co-doped with ytterbium oxide ($Yb_2O_3$), and thereby the crystal structure of scandia-stabilized zirconia may be stabilized into a cubic structure at room temperature while retaining the inherently high oxygen ionic conductivity of a scandia-stabilized zirconia electrolyte (11ScSZ).

It has been confirmed that a 10Sc1YbSZ electrolyte exhibits high ionic conductivity and excellent stability in a reducing atmosphere, but the crystal structure is not stabilized into a cubic structure at room temperature. Hence, the electrolyte of the invention is configured such that at least one oxide selected from among gadolinium oxide ($Gd_2O_3$) and samarium oxide ($Sm_2O_3$) is doped so as to have a cation radius greater than the cation radius (0.84445 Å) of the 10Sc1YbSZ electrolyte, and thus the crystal structure thereof may be stabilized into a cubic structure at room temperature.

The scandia-stabilized zirconia electrolyte may have the composition represented by Chemical Formula 1 below:

$(Sc_2O_3)_x(Re_2O_3)_y(Yb_2O_3)_z(ZrO_2)_{1-x-y-z}$ [Chemical Formula 1]

wherein $0.08 \leq x \leq 0.11$, $0.0005 \leq y \leq 0.01$, $0.0005 \leq z \leq 0.01$, and $Re_2O_3$ is at least one selected from among $Gd_2O_3$ and $Sm_2O_3$.

In Chemical Formula 1, y:z may range from 1:3 to 3:1. The 10Sc1YbSZ electrolyte exhibits high ionic conductivity and superior stability in a reducing atmosphere but is not stabilized into a cubic structure at room temperature. As the Re/Yb ratio is lower due to the doping with a large amount of $Yb_2O_3$, the ionic conductivity of the electrolyte may increase. If the Re/Yb ratio is less than 1/3, sufficient ionic conductivity cannot be achieved. On the other hand, if the Re/Yb ratio is greater than 3, the resulting electrolyte is difficult to stabilize into a cubic structure at room temperature.

In Chemical Formula 1, y+z may be equal to or greater than 0.01. When $Gd_2O_3+Yb_2O_3$ or $Sm_2O_3+Yb_2O_3$ is used in an amount of 1 mol % or more, the resulting electrolyte may be efficiently stabilized into a complete cubic structure at room temperature.

In Chemical Formula 1, $Re_2O_3$ may be gadolinium oxide ($Gd_2O_3$) and the cation radius thereof may range from 0.8441 Å to 0.8450 Å. Given the above range, a complete cubic structure may be obtained at room temperature, and simultaneously, high conductivity close to or greater than 0.14 S/cm may be exhibited.

In Chemical Formula 1, $Re_2O_3$ may be samarium oxide ($Sm_2O_3$), and the cation radius thereof may range from 0.8443 Å to 0.8450 Å. Given the above range, a complete cubic structure may be obtained at room temperature, and simultaneously, high conductivity close to or greater than 0.14 S/cm may be exhibited.

Below, the present invention is described in detail through the following examples and test examples.

TEST EXAMPLE 1

Comparison of 10Sc1ReSZ (Re=Ce, Yb, Gd, Sm) Electrolytes 1-1. Formation of Electrolyte Sample To compare the properties of 10Sc1ReSZ (Re=Ce, Yb, Gd, Sm) electrolytes depending on the kind of Re, electrolyte samples were manufactured according to the composition designs represented by the Chemical Formulas in Table 1 below.

TABLE 1

| Sample | Electrolyte Composition | Chemical Formula |
|---|---|---|
| E1-1 | 10Sc1CeSZ | $(Sc_2O_3)_{0.1}(CeO_2)_{0.01}(ZrO_2)$ 0.89 |
| E1-2 | 10Sc1YbSZ | $(Sc_2O_3)_{0.1}(Yb_2O_3)_{0.01}(ZrO_2)$ 0.89 |
| E1-3 | 10Sc1GdSZ | $(Sc_2O_3)_{0.1}(Gd_2O_3)_{0.01}(ZrO_2)$ 0.89 |
| E1-4 | 10Sc1SmSZ | $(Sc_2O_3)_{0.1}(Sm_2O_3)_{0.01}(ZrO_2)$ 0.89 |

For the electrolyte samples, oxides, for example, $ZrO_2$, $Sc_2O_3$, $CeO_2$, $Yb_2O_3$, $Gd_2O_3$, and $Sm_2O_3$, were applied, and oxide powders were weighed so as to be suitable for the compositions of Table 1 and then subjected to ball milling using a zirconia ($ZrO_2$) ball and an ethanol solvent to yield a homogeneous slurry. The mixed slurry was sufficiently dried in a hot air oven, subjected to dry milling, and then uniaxially pressed, thus producing molded bodies having a width, a length and a thickness of 40 mm×40 mm×4 mm.

To manufacture final electrolyte sintered bodies, individual electrolyte molded bodies were sintered at atmospheric pressure in an air atmosphere under sintering conditions of 1470° C. and 5 hr.

As samples for analyzing the crystal structures of electrolyte sintered bodies, electrolyte samples having polished surfaces were used, and the electrolyte samples for evaluating ionic conductivity were mechanically processed into conductive samples having a width, a length and a height of 2 mm×2 mm×25 mm.

1-2. Evaluation of Ionic Conductivity

The ionic conductivity of the electrolyte samples was measured using a direct-current 4-probe method. The voltage was measured at the applied current and the cross-sectional area and the height of the samples were used to calculate the resistance and conductivity thereof. Measurement was performed in an air atmosphere and a hydrogen atmosphere in the temperature range of 600 to 850° C., which corresponds to the operating temperature of an SOFC.

FIG. 1 is a graph showing the results of measurement of the ionic conductivity of 10Sc1ReSZ (Re=Ce, Yb, Gd, Sm) electrolytes in an air atmosphere depending on the operating temperature. The ion radii of $Ce^{4+}$, $Yb^{3+}$, $Gd^{3+}$, and $Sm^{3+}$ are 0.97 Å, 0.985 Å, 1.053 Å, and 1.079 Å, respectively. As shown in FIG. 1, the temperature-dependent ionic conductivity of the electrolytes other than the 10Sc1CeSZ electrolyte is increased with a decrease in the ion radius of the applied secondary stabilizer (Re).

The ionic conductivity of the zirconia electrolyte having the same crystal structure is known to be affected by both the cation radius and the effective oxygen vacancy concentration. The reason why the ionic conductivity of 10Sc1CeSZ is lower than that of 10Sc1YbSZ is that the doping of $CeO_2$ does not form additional oxygen vacancies, and thus 10Sc1CeSZ has a cation radius smaller than that of 10Sc1YbSZ, but the effective oxygen vacancy concentration thereof is relatively low.

Figure 2:
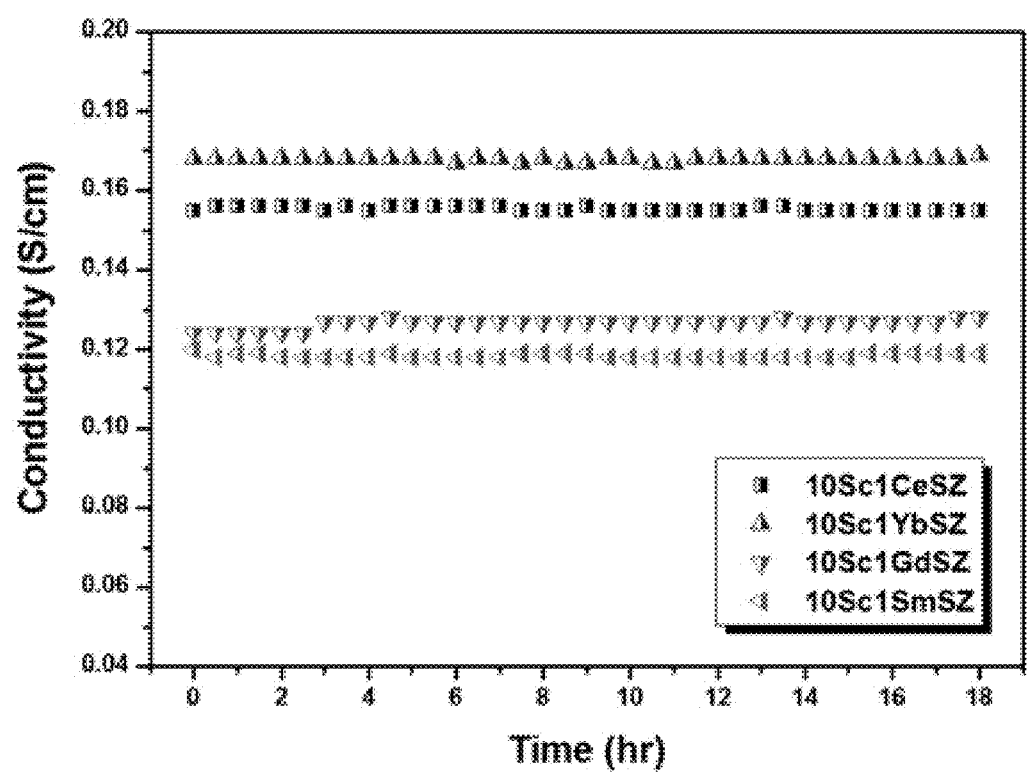
FIG. 2 is a graph showing the stability of the ionic conductivity of the 10Sc1ReSZ (Re=Ce, Yb, Gd, Sm) electrolytes depending on the operating time at an operating temperature fixed to 850° C. in an air atmosphere.

FIG. 2 is a graph showing the stability of the ionic conductivity of 10Sc1ReSZ (Re=Ce, Yb, Gd, Sm) electrolytes depending on the operating time in an air atmosphere under the condition that the operating temperature is fixed to 850° C. All electrolyte compositions exhibited stable characteristics without changes in ionic conductivity depending on the operating time in an air atmosphere.

Figure 3:
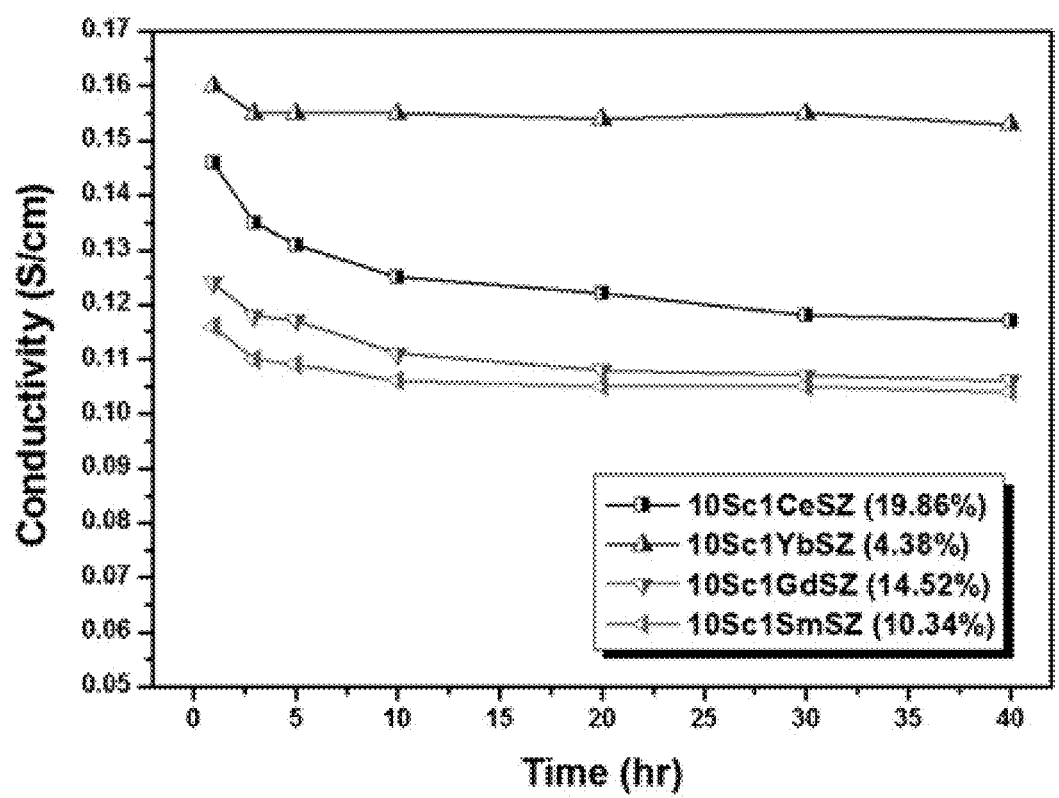
FIG. 3 is a graph showing the stability of the ionic conductivity of the 10Sc1ReSZ (Re=Ce, Yb, Gd, Sm) electrolytes depending on the operating time at an operating temperature fixed to 850° C. in a reducing (hydrogen) atmosphere.

FIG. 3 is a graph showing the stability of the ionic conductivity of 10Sc1ReSZ (Re=Ce, Yb, Gd, Sm) electrolytes depending on the operating time in a reducing (hydrogen) atmosphere under the condition that the operating temperature is fixed to 850° C. In the reducing atmosphere, unlike the air atmosphere, the ionic conductivity decreased depending on the operating time. The 10Sc1CeSZ electrolyte exhibited a high ionic conductivity deterioration of 19.86%, but 10Sc1YbSZ manifested a very low ionic conductivity deterioration of about 4.38%.

1-3. Evaluation of Crystal Structure

Figure 4:
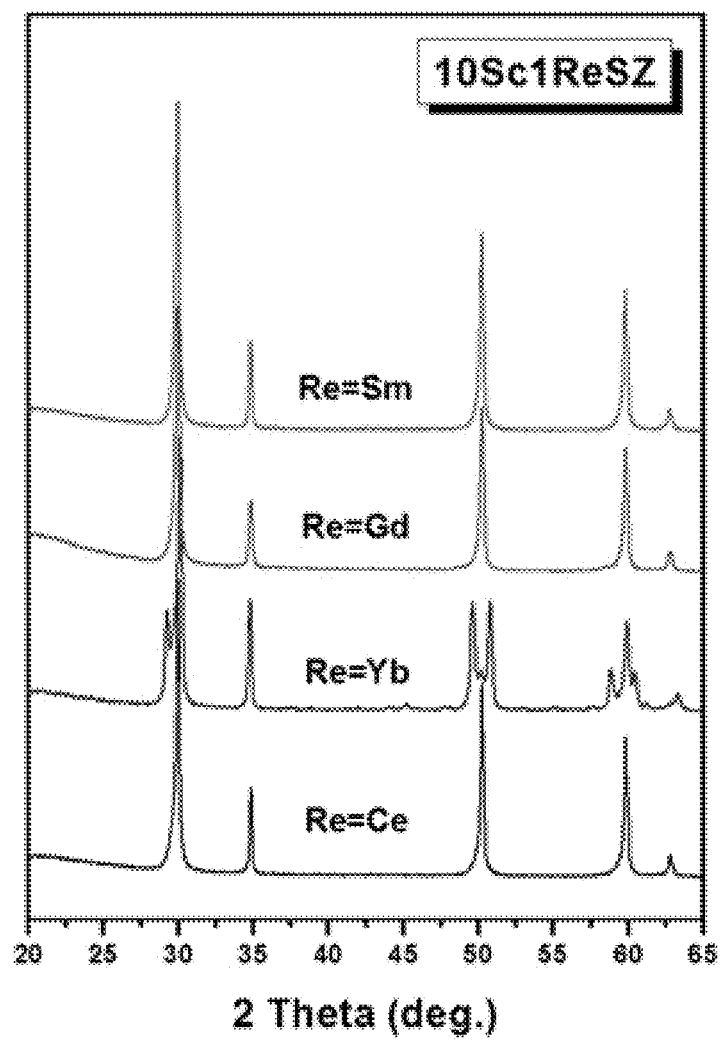
FIG. 4 shows the results of analysis of the crystal structure of the 10Sc1ReSZ (Re=Ce, Yb, Gd, Sm) electrolytes at room temperature using X-ray diffractometry.

FIG. 4 shows the results of analysis of the crystal structure of 10Sc1ReSZ (Re=Ce, Yb, Gd, Sm) electrolytes at room temperature using X-ray diffractometry. In order to evaluate the crystal structure of the electrolyte samples of E1 group, X-ray diffractometry was performed. Consequently, all of the electrolytes other than the 10Sc1YbSZ electrolyte were stabilized into cubic structures at room temperature. In the composition design of zirconia-based electrolytes, the amount of the stabilizer that is doped and the cation radius are regarded as factors important for determining the crystal structure, as well as the ionic conductivity.

Among the electrolytes of the E1 group, the 10Sc1YbSZ electrolyte showed high ionic conductivity and excellent stability in a reducing atmosphere, but was not stabilized into a cubic structure at room temperature. Thus, when the amount of doped $Sc_2O_3$ is 10 mol % and 1 mol % of $Re_2O_3$ having the same trivalent oxidation number is doped, the composition design is required to have a cation radius greater than the cation radius (0.84445 Å) of the 10Sc1YbSZ electrolyte.

TEST EXAMPLE 2

Evaluation of Co-Doping Effect of Re=Yb+Gd, Yb+Sm on 10Sc1ReSZ Electrolyte 2-1. Formation of Electrolyte Sample Electrolyte samples were manufactured according to the composition designs shown in Table 2 below.

TABLE 2

| Sample | | Electrolyte Composition | Chemical Formula |
|---|---|---|---|
| E2 | E2-1 | 10Sc0.75Gd0.25YbSZ | $(SC_2O_3)_{0.1}(Gd_2O_3)_{0.0075}(Yb_2O_3)_{0.0025}(ZrO_2)_{0.89}$ |
| | E2-2 | 10Sc0.5Gd0.5YbSZ | $(SC_2O_3)_{0.1}(Gd_2O_3)_{0.005}(Yb_2O_3)_{0.005}(ZrO_2)_{0.89}$ |
| | E2-3 | 10Sc0.25Gd0.75YbSZ | $(SC_2O_3)_{0.1}(Gd_2O_3)_{0.0025}(Yb_2O_3)_{0.0075}(ZrO_2)_{0.89}$ |
| E3 | E3-1 | 10Sc0.75Sm0.25YbSZ | $(SC_2O_3)_{0.1}(Sm_2O_3)_{0.0075}(Yb_2O_3)_{0.0025}(ZrO_2)_{0.89}$ |
| | E3-2 | 10Sc0.5Sm0.5YbSZ | $(SC_2O_3)_{0.1}(Sm_2O_3)_{0.005}(Yb_2O_3)_{0.005}(ZrO_2)_{0.89}$ |
| | E3-3 | 10Sc0.25Sm0.75YbSZ | $(SC_2O_3)_{0.1}(Sm_2O_3)_{0.0025}(Yb_2O_3)_{0.0075}(ZrO_2)_{0.89}$ |

The electrolyte samples were manufactured in the same manner as the electrolytes of E1 group.

2-2. Evaluation of Ionic Conductivity

The results of measurement of the cation radius and the ionic conductivity in an air atmosphere of electrolytes of E2 group and E1-2 and E1-3 electrolytes according to an embodiment of the present invention are shown in Table 3 below. As the relative content ratio (Gd/Yb) was decreased, the ionic conductivity was increased. This is because the cation radius is smaller.

TABLE 3

| Sample | Composition | Cation Radius | Ionic conductivity @850° C. |
|---|---|---|---|
| E1-2 | 10Sc1YbSZ | 0.84445 Å | 0.169 S/cm |
| E2-3 | 10Sc0.25Gd0.75YbSZ | 0.84462 Å | 0.155 S/cm |
| E2-2 | 10Sc0.5Gd0.5YbSZ | 0.84479 Å | 0.151 S/cm |
| E2-1 | 10Sc0.75Gd0.25YbSZ | 0.84496 Å | 0.139 S/cm |
| E1-3 | 10Sc1GdSZ | 0.84513 Å | 0.124 S/cm |

In particular, the ionic conductivity of the E2-3 electrolyte was equal to the ionic conductivity (0.156 S/cm) of the 10Sc1CeSZ electrolyte.

The results of measurement of the cation radius and the ionic conductivity in an air atmosphere of electrolytes of E3 group and E1-2 and E1-4 electrolytes according to an embodiment of the present invention are shown in Table 4 below. As is apparent from the electrolytes of E2 group, when the relative content ratio (Sm/Yb) was decreased, the ionic conductivity was increased.

TABLE 4

| Sample | Composition | Cation Radius | Ionic conductivity @850° C. |
|---|---|---|---|
| E1-2 | 10Sc1YbSZ | 0.84445 Å | 0.169 S/cm |
| E3-3 | 10Sc0.25Sm0.75YbSZ | 0.84469 Å | 0.140 S/cm |
| E3-2 | 10Sc0.5Sm0.5YbSZ | 0.84492 Å | 0.133 S/cm |
| E3-1 | 10Sc0.75Sm0.25YbSZ | 0.84516 Å | 0.121 S/cm |
| E1-4 | 10Sc1SmSZ | 0.84539 Å | 0.119 S/cm |

Figure 5:
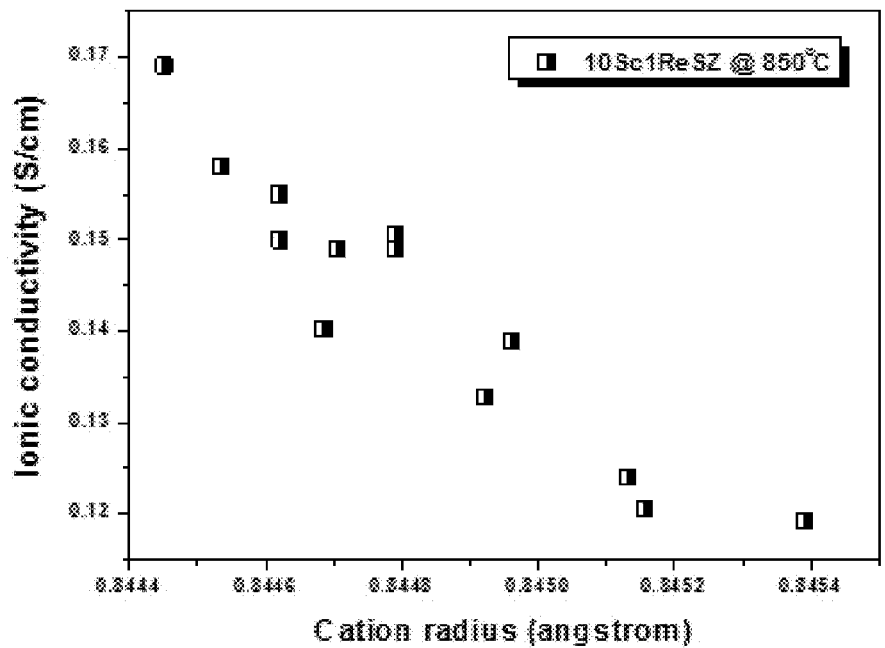
FIG. 5 is a graph showing the cation radius of the electrolytes of E1, E2 and E3 groups according to an embodiment of the present invention and the ionic conductivity thereof at 850° C. in an air atmosphere.

FIG. 5 is a graph showing the cation radius of the electrolytes of E1, E2 and E3 groups according to an embodiment of the present invention and the ionic conductivity thereof at 850° C. in an air atmosphere. When the oxygen ion vacancy concentrations are the same, the ionic conductivity may be efficiently controlled by adjusting the ion radius of the secondary stabilizer.

As shown in FIG. 5, when the amount of doped $Sc_2O_3$ is 10 mol % and 1 mol % of trivalent $Re_2O_3$ is additionally doped, the composition design is preferably required to realize a cation radius of 0.8448 Å or less, thus ensuring relatively high ionic conductivity.

Figure 6:
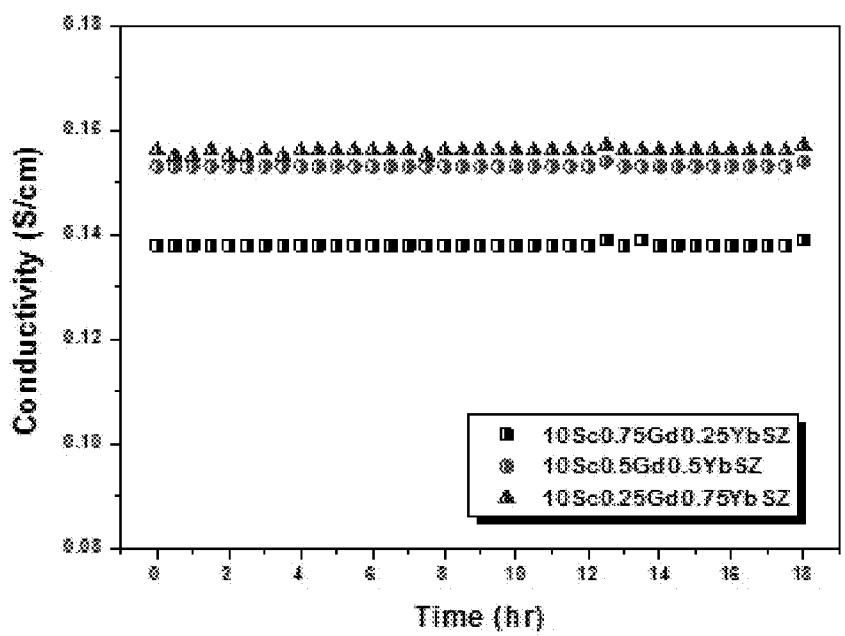
FIG. 6 is a graph showing the stability of the ionic conductivity of the electrolytes of E2 group according to an embodiment of the present invention depending on the operating time at an operating temperature fixed to 850° C. in an air atmosphere.

FIG. 6 is a graph showing the stability of the ionic conductivity of the electrolytes of E2 group according to an embodiment of the present invention depending on the operating time in an air atmosphere under the condition that the operating temperature is fixed to 850° C. All the electrolyte compositions of E2 group exhibited stable characteristics without changes in ionic conductivity depending on the operating time in an air atmosphere.

Figure 7:
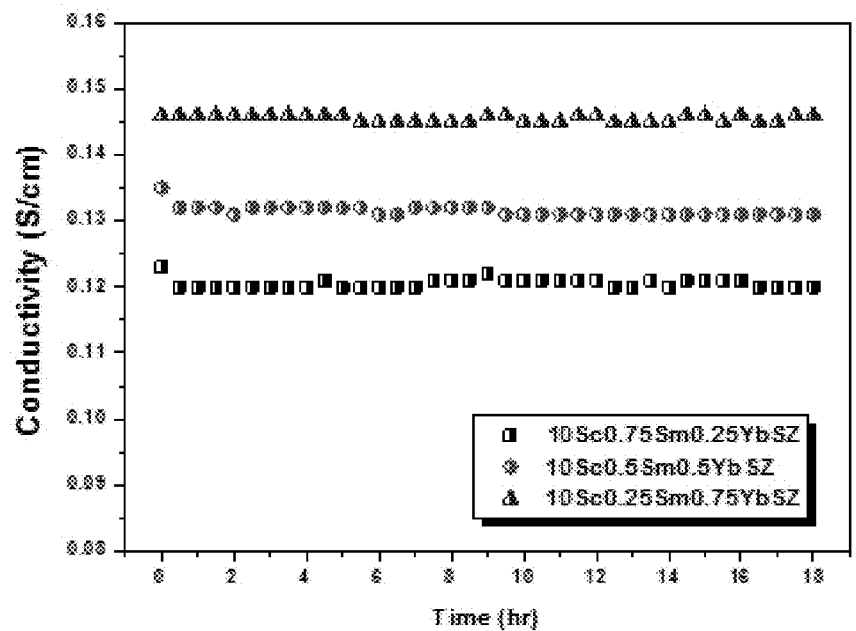
FIG. 7 is a graph showing the stability of the ionic conductivity of the electrolytes of E3 group according to an embodiment of the present invention depending on the operating time at an operating temperature fixed to 850° C. in an air atmosphere.

FIG. 7 is a graph showing the stability of the ionic conductivity of the electrolytes of E3 group according to an embodiment of the present invention depending on the operating time in an air atmosphere under the condition that the operating temperature is fixed to 850° C. All the electrolyte compositions of E3 group exhibited almost uniform ionic conductivity depending on the operation time in an air atmosphere, and the conductivity of the E3-1 and E3-2 compositions was initially slightly decreased but was then maintained stable.

Figure 8:
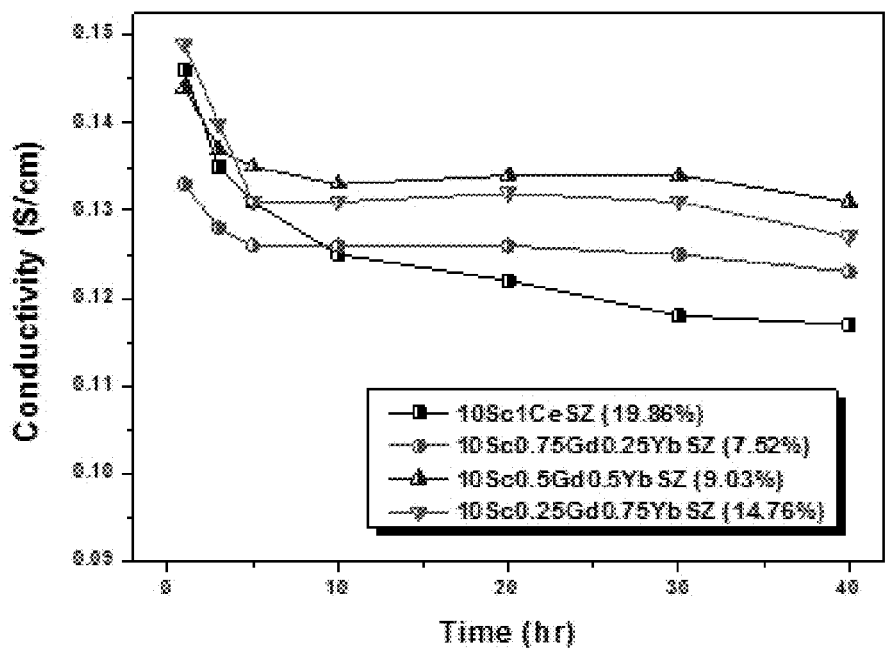
FIG. 8 is a graph showing the stability of the ionic conductivity of the electrolytes of E2 group according to an embodiment of the present invention depending on the operating time at an operating temperature fixed to 850° C. in a reducing (hydrogen) atmosphere.

FIG. 8 is a graph showing the stability of the ionic conductivity of the electrolytes of E2 group according to an embodiment of the present invention depending on the operating time in a reducing (hydrogen) atmosphere under the condition that the operating temperature is fixed to 850° C. These electrolytes exhibited low deterioration characteristics compared to the 10Sc1CeSZ electrolyte, and the deterioration rate was lowered with an increase in the Gd/Yb ratio. In particular, when the Gd/Yb ratio was 1 or more, the deterioration rate was lowered to about 50% compared to the 10Sc1CeSZ electrolyte.

Figure 9:
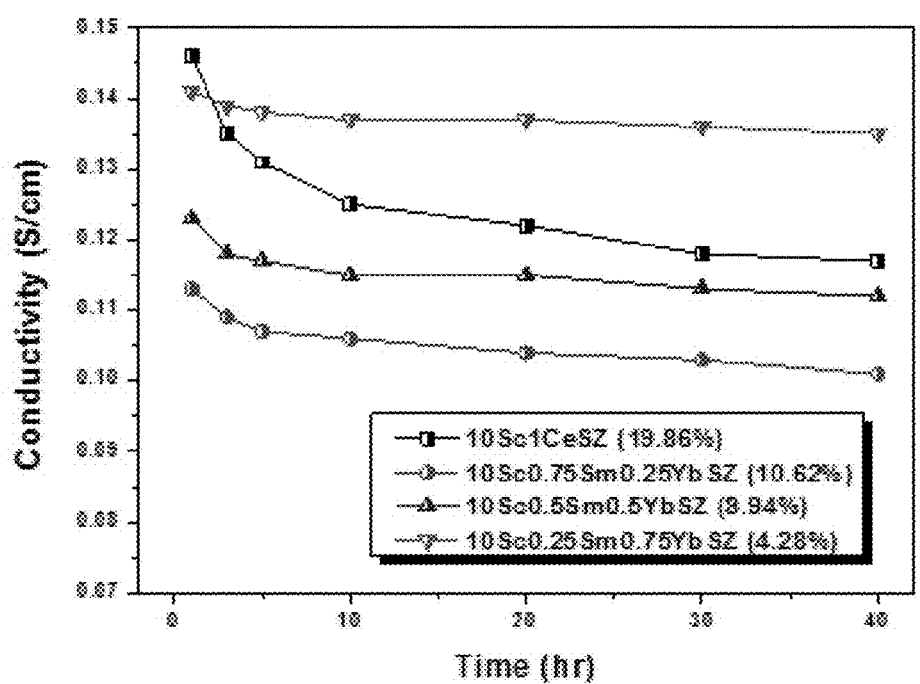
FIG. 9 is a graph showing the stability of the ionic conductivity of the electrolytes of E3 group according to an embodiment of the present invention depending on the operating time at an operating temperature fixed to 850° C. in a reducing (hydrogen) atmosphere.

FIG. 9 is a graph showing the stability of the ionic conductivity of the electrolytes of E3 group according to an embodiment of the present invention depending on the operating time in a reducing (hydrogen) atmosphere under the condition that the operating temperature is fixed to 850° C. The electrolytes of E3 group exhibited low deterioration characteristics compared to the 7Sc1CeSZ electrolyte, and the deterioration rate thereof was increased with an increase in the Sm/Yb ratio, in contrast to the E2 group. In particular, when the Sm/Yb ratio exceeded 1/3, the deterioration rate was lowered to about 50% compared to the 10Sc1CeSZ electrolyte.

2-3. Evaluation of Crystal Structure

Figure 10:
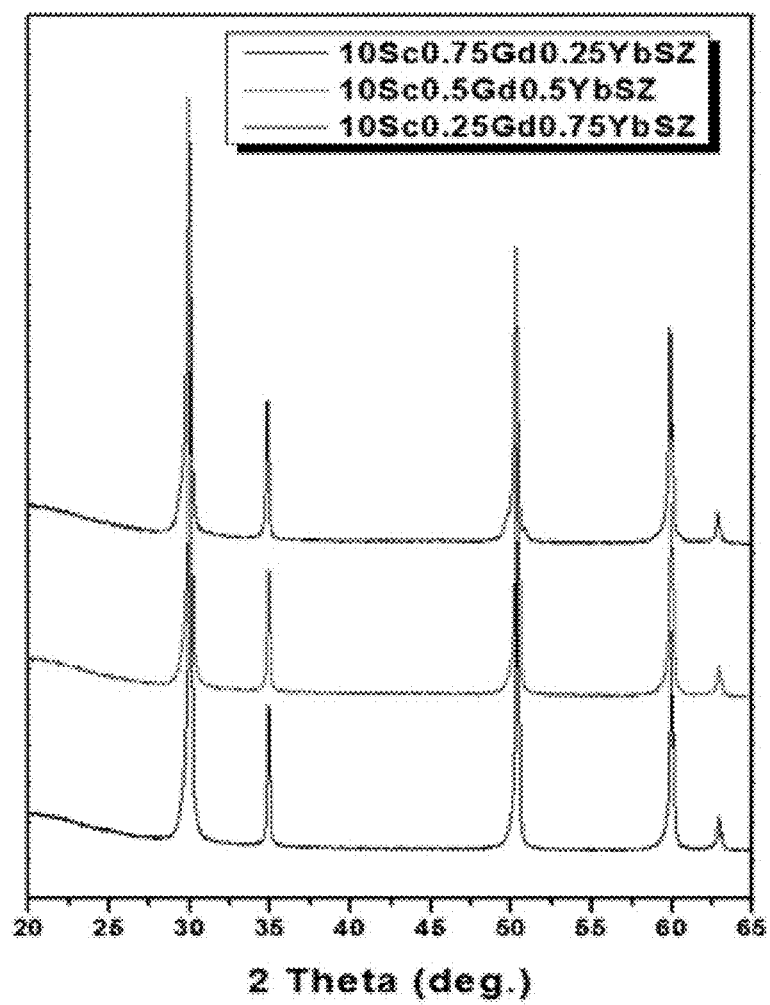
FIG. 10 shows the results of analysis of the crystal structure of the electrolytes of E2 group according to an embodiment of the present invention at room temperature using X-ray diffractometry.
Figure 11:
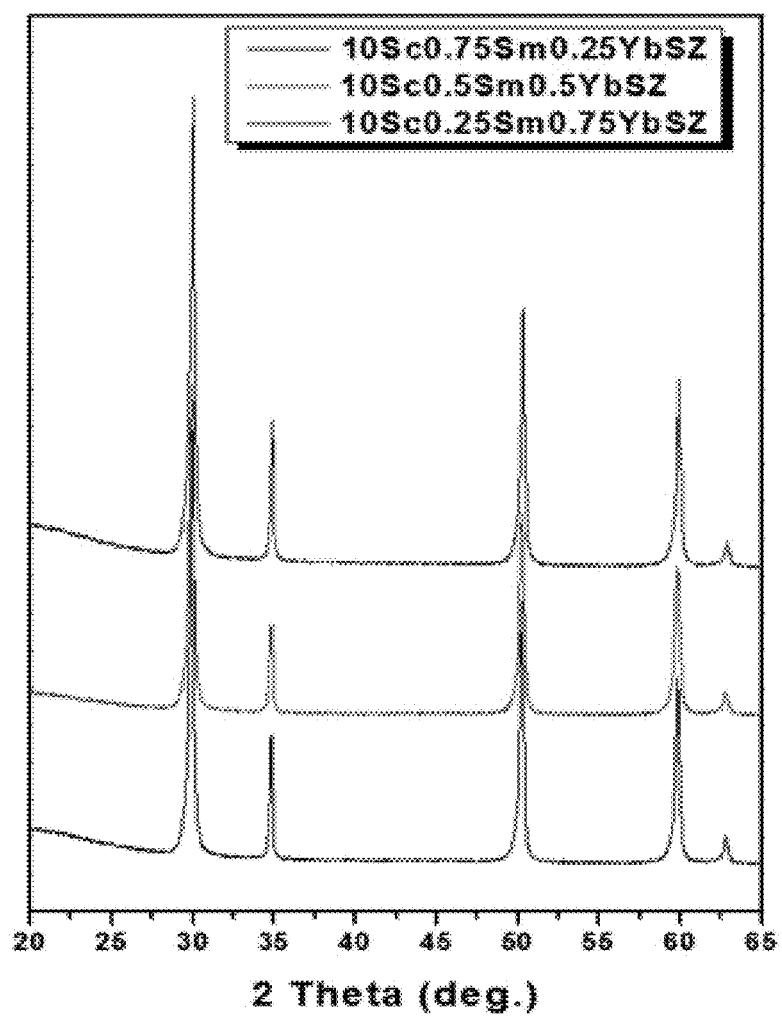
FIG. 11 shows the results of analysis of the crystal structure of the electrolytes of E3 group according to an embodiment of the present invention at room temperature using X-ray diffractometry.

In order to evaluate the crystal structure of the electrolyte samples of E2 and E3 groups, X-ray diffractometry was performed. The results are shown in FIGS. 10 and 11. The 10Sc1YbSZ electrolyte was not stabilized into a cubic structure at room temperature. However, when a portion of Yb was doped with Gd and Sm, stabilization was achieved. All the electrolyte samples of E2 to E3 groups exhibited a cubic structure at room temperature.

When 10 mol % of $Sc_2O_3$ was doped and 1 mol % of trivalent $Re_2O_3$ (Re=Yb+Gd, Yb+Sm) was additionally doped, the resulting electrolytes were efficiently controlled into a cubic structure within a cation radius range from 0.84462 Å to 0.84516 Å.

TEST EXAMPLE 3

Comparison of Characteristics of Electrolytes Depending on the Amount of Doped $Sc_2O_3$ and the Kind of Re in XSc0.5Re0.5YbSZ (X=8 to 11, Re=Gd, Sm) Electrolytes 3-1. Formation of Electrolyte Sample Electrolyte samples were manufactured according to the composition designs shown in Table 5 below.

TABLE 5

| Sample | | Electrolyte Composition | Chemical Formula |
|---|---|---|---|
| E4 | E4-1 | 8Sc0.5Gd0.5YbSZ | $(Sc_2O_3)_{0.08}(Gd_2O_3)_{0.005}(Yb_2O_3)_{0.005}(ZrO_2)_{0.91}$ |
| | E4-2 | 8.5Sc0.5Gd0.5YbSZ | $(Sc_2O_3)_{0.085}(Gd_2O_3)_{0.005}(Yb_2O_3)_{0.005}(ZrO_2)_{0.905}$ |
| | E4-3 | 9Sc0.5Gd0.5YbSZ | $(Sc_2O_3)_{0.09}(Gd_2O_3)_{0.005}(Yb_2O_3)_{0.005}(ZrO_2)_{0.9}$ |
| | E4-4 | 9.5Sc0.5Gd0.5YbSZ | $(Sc_2O_3)_{0.095}(Gd_2O_3)_{0.005}(Yb_2O_3)_{0.005}(ZrO_2)_{0.895}$ |
| | E4-5 | 10Sc0.5Gd0.5YbSZ | $(Sc_2O_3)_{0.1}(Gd_2O_3)_{0.005}(Yb_2O_3)_{0.005}(ZrO_2)_{0.89}$ |
| | E4-6 | 10.5Sc0.5Gd0.5YbSZ | $(Sc_2O_3)_{0.105}(Gd_2O_3)_{0.005}(Yb_2O_3)_{0.005}(ZrO_2)_{0.885}$ |
| | E4-7 | 11Sc0.5Gd0.5YbSZ | $(Sc_2O_3)_{0.11}(Gd_2O_3)_{0.005}(Yb_2O_3)_{0.005}(ZrO_2)_{0.88}$ |
| E5 | E5-1 | 8Sc0.5Sm0.5YbSZ | $(Sc_2O_3)_{0.08}(Sm_2O_3)_{0.005}(Yb_2O_3)_{0.005}(ZrO_2)_{0.91}$ |
| | E5-2 | 8.5Sc0.5Sm0.5YbSZ | $(Sc_2O_3)_{0.085}(Sm_2O_3)_{0.005}(Yb_2O_3)_{0.005}(ZrO_2)_{0.905}$ |
| | E5-3 | 9Sc0.5Sm0.5YbSZ | $(Sc_2O_3)_{0.09}(Sm_2O_3)_{0.005}(Yb_2O_3)_{0.005}(ZrO_2)_{0.9}$ |
| | E5-4 | 9.5Sc0.5Sm0.5YbSZ | $(Sc_2O_3)_{0.095}(Sm_2O_3)_{0.005}(Yb_2O_3)_{0.005}(ZrO_2)_{0.895}$ |
| | E5-5 | 10Sc0.5Sm0.5YbSZ | $(Sc_2O_3)_{0.1}(Sm_2O_3)_{0.005}(Yb_2O_3)_{0.005}(ZrO_2)_{0.89}$ |
| | E5-6 | 10.5Sc0.5Sm0.5YbSZ | $(Sc_2O_3)_{0.105}(Sm_2O_3)_{0.005}(Yb_2O_3)_{0.005}(ZrO_2)_{0.885}$ |
| | E5-7 | 11Sc0.5Sm0.5YbSZ | $(Sc_2O_3)_{0.11}(Sm_2O_3)_{0.005}(Yb_2O_3)_{0.005}(ZrO_2)_{0.88}$ |

The electrolyte samples were manufactured in the same manner as the electrolytes of E1 group.

3-2. Evaluation of Ionic Conductivity

The results of measurement of the cation radius and the ionic conductivity in an air atmosphere of the electrolytes of E4 group according to an embodiment of the present invention are shown in Table 6 below.

When the amount of doped $Sc_2O_3$ was increased, the ionic conductivity was gradually raised, and was highest in the E4-4 composition. Then, as the amount of doped $Sc_2O_3$ was further increased, the ionic conductivity was gradually decreased. In particular, the E4-4 electrolyte exhibited higher conductivity than that of the 10Sc1CeSZ electrolyte. When 0.5 mol % of $Yb_2O_3$ and 0.5 mol % of $Gd_2O_3$ were doped in the electrolytes of E4 group, the amount of doped $Sc_2O_3$ able to ensure high ionic conductivity of 0.15 S/cm or more was measured to be 9.5 to 10 mol %, and the cation radius of the composition fell in the range of 0.8446 Å to 0.8448 Å.

TABLE 6

| Sample | Composition | Cation Radius | Ionic conductivity @850° C. |
|---|---|---|---|
| E4-1 | 8Sc0.5Gd0.5YbSZ | 0.84419 Å | 0.142 S/cm |
| E4-2 | 8.5Sc0.5Gd0.5YbSZ | 0.84434 Å | 0.146 S/cm |
| E4-3 | 9Sc0.5Gd0.5YbSZ | 0.84449 Å | 0.147 S/cm |
| E4-4 | 9.5Sc0.5Gd0.5YbSZ | 0.84464 Å | 0.169 S/cm |
| E4-5 | 10Sc0.5Gd0.5YbSZ | 0.84479 Å | 0.151 S/cm |
| E4-6 | 10.5Sc0.5Gd0.5YbSZ | 0.84494 Å | 0.146 S/cm |
| E4-7 | 11Sc0.5Gd0.5YbSZ | 0.84509 Å | 0.135 S/cm |

The results of measurement of the cation radius and the ionic conductivity in an air atmosphere of the electrolytes of E5 group according to an embodiment of the present invention are shown in Table 7 below.

When the amount of doped $Sc_2O_3$ was increased, the ionic conductivity was decreased. The E5-1 and E5-2 electrolytes exhibited high ionic conductivity equal to that of the 10Sc1CeSZ electrolyte.

When 0.5 mol % of $Yb_2O_3$ and 0.5 mol % of $Sm_2O_3$ were doped in the electrolytes of E5 group, the amount of doped $Sc_2O_3$ able to ensure high ionic conductivity of 0.15 S/cm or more was measured to be 8 to 8.5 mol %, and the cation radius of the composition fell in the range of 0.8443 Å to 0.8445 Å.

TABLE 7

| Sample | Composition | Cation Radius | Ionic conductivity @850° C. |
|---|---|---|---|
| E5-1 | 8Sc0.5Sm0.5YbSZ | 0.84432 Å | 0.159 S/cm |
| E5-2 | 8.5Sc0.5Sm0.5YbSZ | 0.84447 Å | 0.158 S/cm |
| E5-3 | 9Sc0.5Sm0.5YbSZ | 0.84462 Å | 0.148 S/cm |
| E5-4 | 9.5Sc0.5Sm0.5YbSZ | 0.84477 Å | 0.139 S/cm |
| E5-5 | 10Sc0.5Sm0.5YbSZ | 0.84492 Å | 0.151 S/cm |
| E5-6 | 10.5Sc0.5Sm0.5YbSZ | 0.84507 Å | 0.126 S/cm |
| E5-7 | 11Sc0.5Sm0.5YbSZ | 0.84522 Å | 0.125 S/cm |

Figure 12:
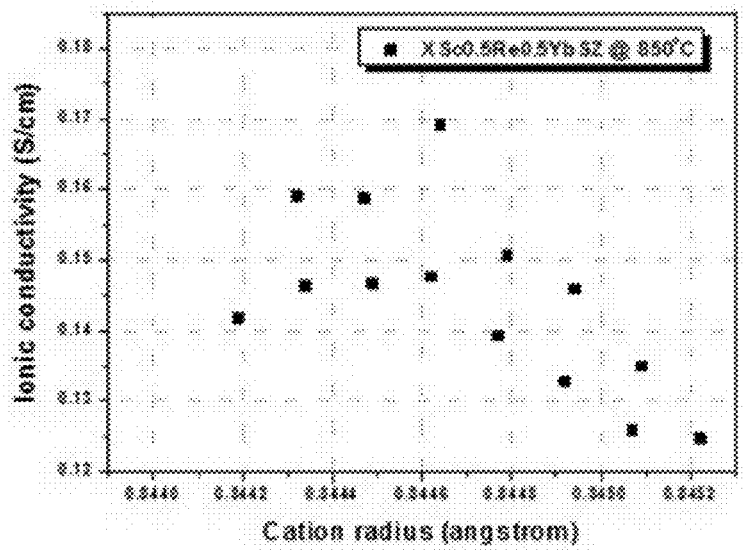
FIG. 12 is a graph showing the cation radius of the electrolytes of E4 and E5 groups according to an embodiment of the present invention and the ionic conductivity thereof at 850° C. in an air atmosphere.

FIG. 12 is a graph showing the cation radius and the ionic conductivity at 850° C. in an air atmosphere in the electrolytes of E4 and E5 groups according to an embodiment of the present invention. The cation radius of the electrolytes, which exhibit high conductivity close to or greater than 0.15 S/cm, was measured to fall in the range of 0.8442 to 0.8448 Å.

Figure 13:
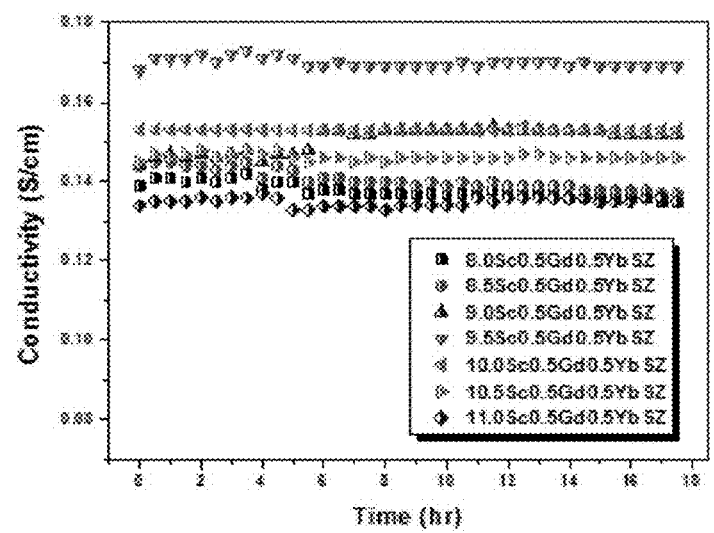
FIG. 13 is a graph showing the stability of the ionic conductivity of the electrolytes of E4 group according to an embodiment of the present invention depending on the operating time at an operating temperature fixed to 850° C. in an air atmosphere.
Figure 14:
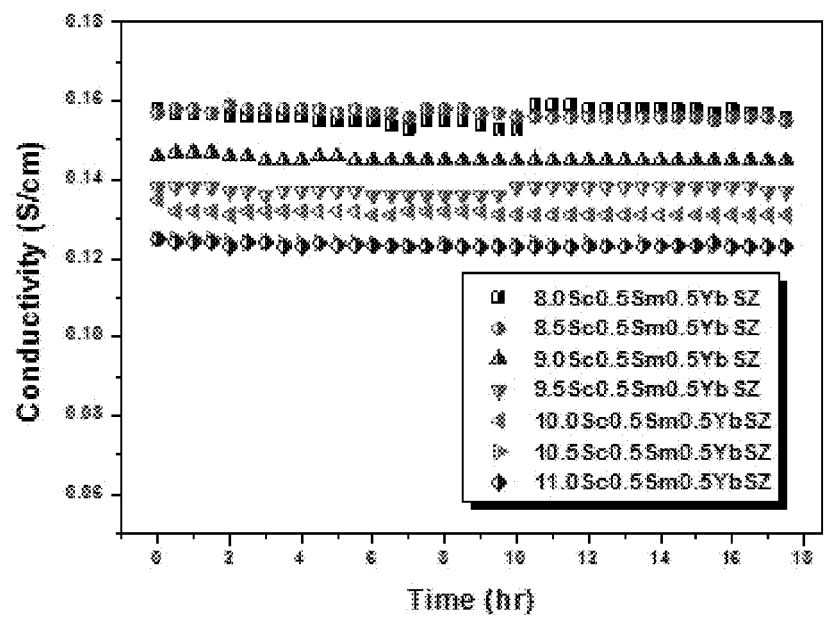
FIG. 14 is a graph showing the stability of the ionic conductivity of the electrolytes of E5 group according to an embodiment of the present invention depending on the operating time at an operating temperature fixed to 850° C. in an air atmosphere.

FIGS. 13 and 14 are graphs showing the stability of the ionic conductivity of the electrolytes of E4 and E5 groups according to an embodiment of the present invention depending on the operating time in an air atmosphere under the condition that the operating temperature is fixed to 850° C. All the electrolyte compositions stably maintained conductivity in an air atmosphere regardless of the amount of doped $Sc_2O_3$.

Figure 15:
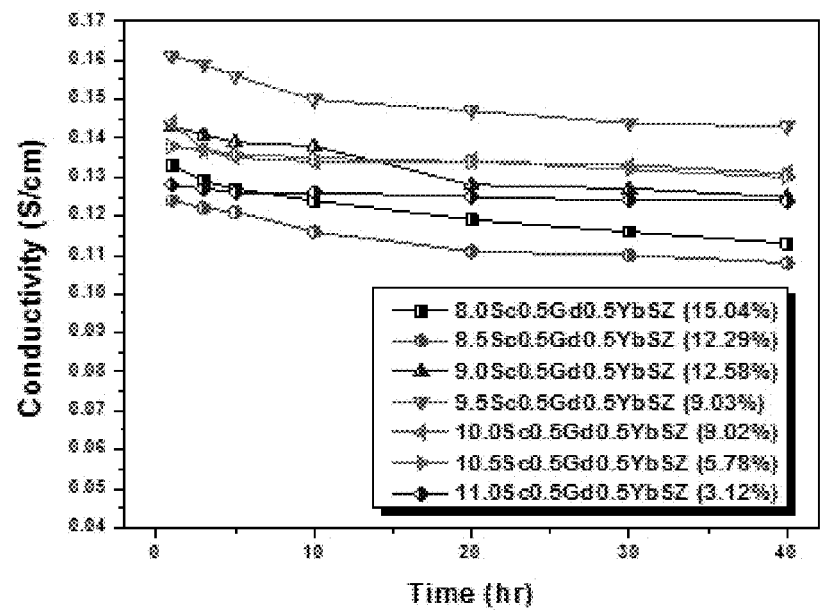
FIG. 15 is a graph showing the stability of the ionic conductivity of the electrolytes of E4 group according to an embodiment of the present invention depending on the operating time at an operating temperature fixed to 850° C. in a reducing (hydrogen) atmosphere.
Figure 16:
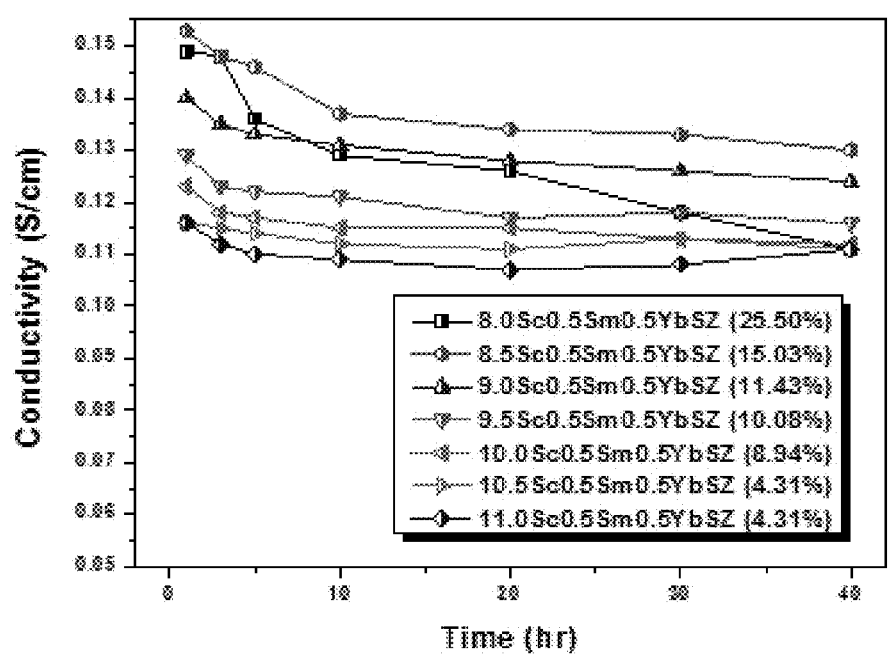
FIG. 16 is a graph showing the stability of the ionic conductivity of the electrolytes of E5 group according to an embodiment of the present invention depending on the operating time at an operating temperature fixed to 850° C. in a reducing (hydrogen) atmosphere.

FIGS. 15 and 16 are graphs showing the stability of the ionic conductivity of the electrolytes of E4 and E5 groups according to an embodiment of the present invention depending on the operating time in a reducing (hydrogen) atmosphere under the condition that the operating temperature is fixed to 850° C. Consequently, the electrolytes of all groups exhibited a decrease in the deterioration rate with an increase in the amount of doped $Sc_2O_3$.

3-3. Evaluation of Crystal Structure

Figure 17:
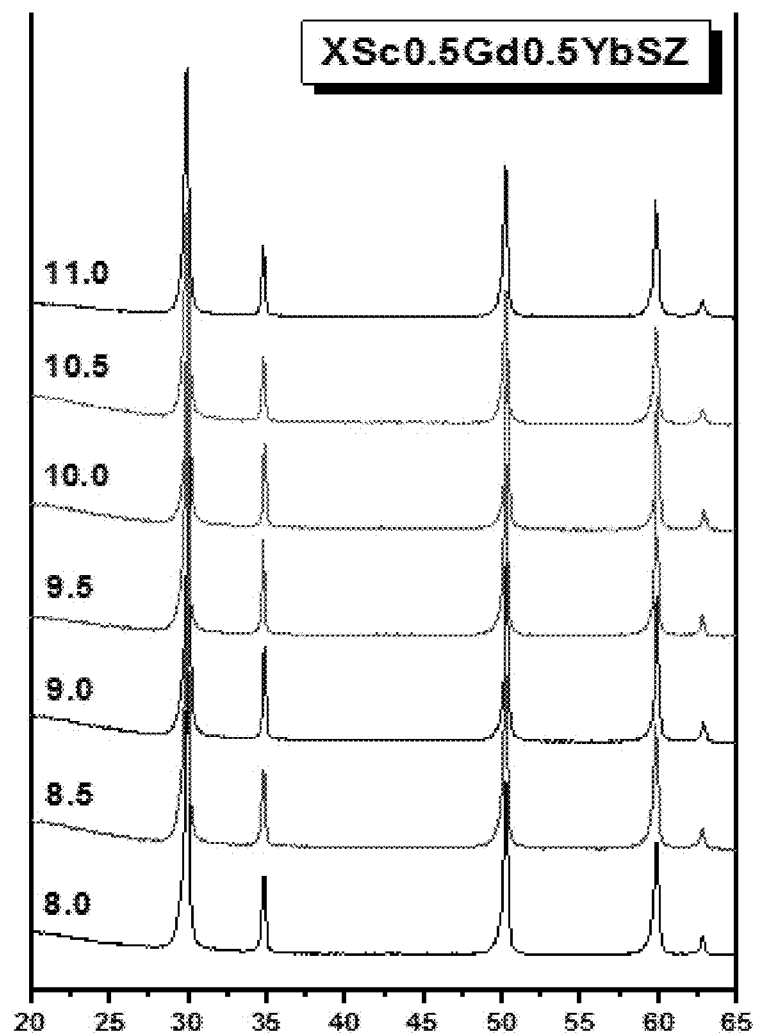
FIG. 17 shows the results of analysis of the crystal structure of the electrolytes of E4 group according to an embodiment of the present invention at room temperature using X-ray diffractometry.
Figure 18:
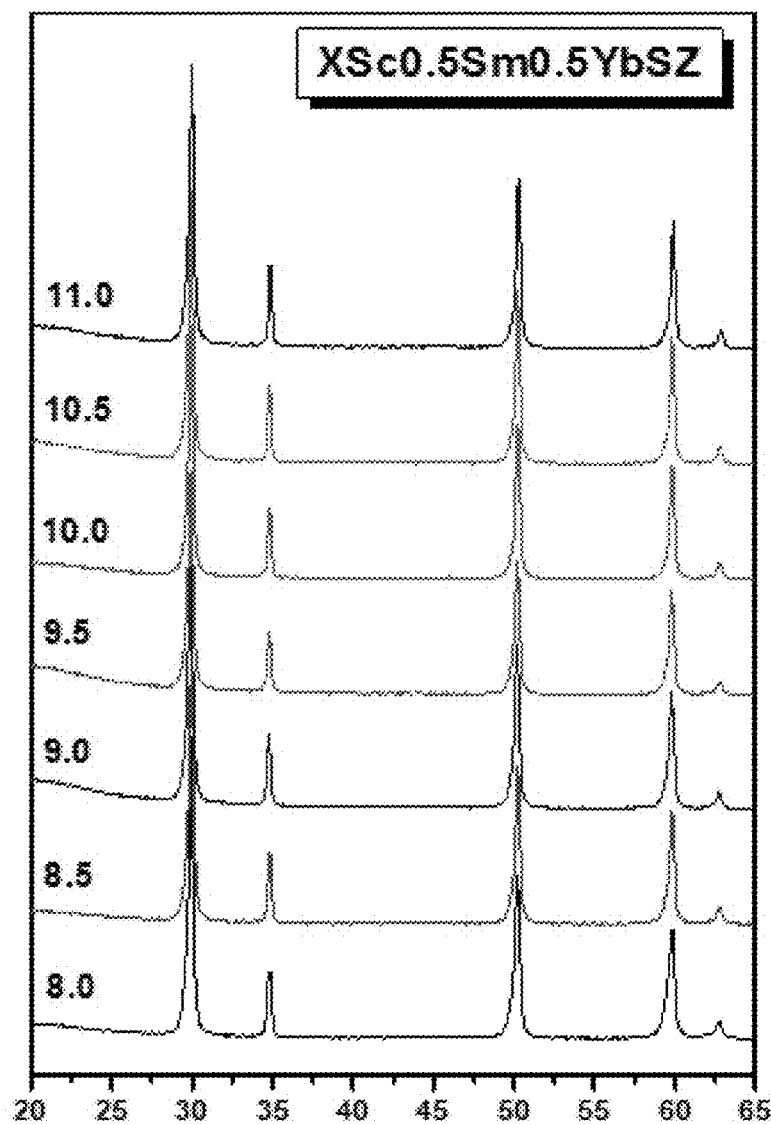
FIG. 18 shows the results of analysis of the crystal structure of the electrolytes of E5 group according to an embodiment of the present invention at room temperature using X-ray diffractometry.

FIGS. 17 and 18 show the results of analysis of the crystal structures of the electrolytes of E4 and E5 groups according to an embodiment of the present invention at room temperature using X-ray diffractometry. The E4 and E5 groups were well stabilized into a cubic structure at room temperature regardless of the amount of doped $Sc_2O_3$, and high ionic conductivity was simultaneously ensured in the given composition ranges.

As mentioned hereinbefore, although the preferred embodiments of the present invention have been disclosed herein and in the drawings, those skilled in the art will appreciate that various modifications, additions and substitutions are possible, without departing from the scope and spirit of the invention as disclosed in the accompanying claims.

What is claimed is:

1. A scandia-stabilized zirconia electrolyte for a solid oxide fuel cell, comprising:
    a zirconia ($ZrO_2$) electrolyte stabilized by doping with scandium oxide ($Sc_2O_3$); and
    at least one of gadolinium oxide ($Gd_2O_3$) and samarium oxide ($Sm_2O_3$) being co-doped with ytterbium oxide ($Yb_2O_3$) to improve stability of an oxygen ionic conductivity in a reducing atmosphere,
    wherein the scandia-stabilized zirconia electrolyte has a composition represented by Chemical Formula 1 below:

$(Sc_2O_3)_x(Re_2O_3)_y(Yb_2O_3)_z(ZrO_2)_{1-x-y-z}$  [Chemical Formula 1]

wherein
    $0.08 \leq x \leq 0.11$,
    $0.0005 \leq y \leq 0.01$,
    $0.0005 \leq z \leq 0.01$,
    $Re_2O_3$ is at least one of $Gd_2O_3$ and $Sm_2O_3$, and
    when $Re_2O_3$ is $Gd_2O_3$ then y:z is 1:1 to 3:1, and when $Re_2O_3$ is $Sm_2O_3$ then y:z is 1:3 to 1:1.

2. The scandia-stabilized zirconia electrolyte of claim 1, wherein the scandia-stabilized zirconia electrolyte has a cubic crystal structure at room temperature and a cation radius ranging from 0.8440 to 0.8453 Å.

3. The scandia-stabilized zirconia electrolyte of claim 1, wherein in Chemical Formula 1, y+z is 0.01 or more.

4. The scandia-stabilized zirconia electrolyte of claim 1, wherein in Chemical Formula 1, $Re_2O_3$ is gadolinium oxide ($Gd_2O_3$) and has a cation radius ranging from 0.8441 to 0.8450 Å.

5. The scandia-stabilized zirconia electrolyte of claim 1, wherein in Chemical Formula 1, $Re_2O_3$ is samarium oxide ($Sm_2O_3$) and has a cation radius ranging from 0.8443 to 0.8450 Å.

* * * * *